(12) United States Patent
Bendersky et al.

(10) Patent No.: US 10,579,830 B1
(45) Date of Patent: Mar. 3, 2020

(54) JUST-IN-TIME AND SECURE ACTIVATION OF SOFTWARE

(71) Applicant: CyberArk Software Ltd., Petach-Tikva (IL)

(72) Inventors: Arthur Bendersky, Tel Aviv (IL); Dima Barboi, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/555,476

(22) Filed: Aug. 29, 2019

(51) Int. Cl.
*H04L 29/06* (2006.01)
*G06F 21/62* (2013.01)
*G06F 21/57* (2013.01)
*G06F 21/60* (2013.01)
*G06F 21/44* (2013.01)
*G06F 21/12* (2013.01)

(52) U.S. Cl.
CPC ............ *G06F 21/629* (2013.01); *G06F 21/12* (2013.01); *G06F 21/44* (2013.01); *G06F 21/57* (2013.01); *G06F 21/602* (2013.01)

(58) Field of Classification Search
None
See application file for complete search history.

(56) References Cited

PUBLICATIONS

Microsoft, Transform IT Service Delivery for Your Modern Workplace (5 pages).
Manageengine, Desktop, Mobile Device, and Browser Security Management (6 pages).

*Primary Examiner* — Shin-Hon (Eric) Chen
(74) *Attorney, Agent, or Firm* — Finnegan, Henderson, Farabow, Garrett & Dunner, LLP

(57) ABSTRACT

Disclosed embodiments relate to systems and methods for securely and efficiently enabling activation of access-limited software to permitted identities. Techniques include receiving, from a personal computing device associated with an identity, a software identifier associated with access-limited software available on an endpoint computing resource; identifying a tenant identifier associated with the identity; identifying a prompt to activate the access-limited software available on the endpoint computing resource; determining that the identity is permitted to utilize the access-limited software based on at least the software identifier and tenant identifier; and enabling, based on the determining, activation of the access-limited software for use by the identity at the endpoint computing resource.

17 Claims, 13 Drawing Sheets

JUST-IN-TIME AND SECURE ACTIVATION OF SOFTWARE

BACKGROUND

In modern enterprises and networks, software is regularly being provided to computing devices such as personal computers, mobile devices, servers, routers, gateways, switches, IoT devices, and more. In addition to software itself, computing devices frequently need to receive updates, such as patches, fixes, and upgrades.

For several reasons, organizations often need to track the provisioning, usage, and status of software and updates throughout their universe of deployed computing devices. For example, organizations often desire to obtain security-related information regarding which users have particular software, what rights they have in the software, what features they use, how often they are used, whether the software is current or is lacking a particular update, and various other types of security-related information. In addition, organizations frequently desire to maintain metrics regarding software usage, and to do so maintain the similar types of information regarding deployed software. Further, because many software programs and updates are subject to license terms, there are often needs to ensure an authorized set of computing devices has particular software or updates, has current versions of such software, and is using the software in an authorized manner. Additionally, organizations often need to track this type of information regarding deployed software in order to ensure that only authorized software is permitted to communicate with backend systems (e.g., servers, databases, etc.). If unauthorized software is permitted to access such backend systems—or any software may do so without limitation—backend systems may consequently face security threats and load problems.

There is a lack of reliable, secure, and flexible techniques to monitor and control deployed software and software updates. For example, some approaches involve provisioning license keys (e.g., long strings of characters) together with software. Upon installation, an administrator may manually enter the license key. This approach is cumbersome and insecure, since administrators are tasked with manually entering the key, keeping track of the key in association with the authorized user, and concealing the key from unauthorized users. If an attacker or unauthorized user manages to obtain the key, they may potentially use it to obtain improper use of the software. Another approach involves providing client certificates to computing devices as a parameter of setup files (e.g., Microsoft Installer™ or MSI files, RPM files, etc.). This may enable only authorized software to be installed on trusted client devices. Nevertheless, this approach is complex (e.g., requires changes to setup files) and is vulnerable to insecurities if the certificates are stolen. An additional approach may involve creating custom setup files (e.g., MSI or RPM, etc.) on a per-customer basis, where the files include unique globally unique identifiers (GUIDs). The GUIDs may link the software to a particular user. While this may limit access to software based on users having a valid GUID, this approach is also complex and requires customization of setup files and hence the involvement of an administrator.

Accordingly, in view of these and other deficiencies in existing techniques for managing deployed software, technological solutions are needed for securely, efficiently, and flexibly coordinating the provisioning, use, and updating of software. Solutions should enable users to securely activate software on their own machines as needed, as well as allow administrators to do so when appropriate.

Techniques should ideally be quick and dynamic (e.g., just-in-time), and not require customization of setup files. Further, techniques should advantageously limit only authorized software instances to communicate with backend systems (e.g., servers, databases, etc.).

SUMMARY

Various disclosed embodiments describe non-transitory computer readable media, systems, and methods for securely and efficiently enabling activation of access-limited software to permitted identities.

For example, in an exemplary embodiment, there may be a non-transitory computer readable medium including instructions that, when executed by at least one processor, cause the at least one processor to perform operations for securely and efficiently enabling activation of access-limited software to permitted identities. The operations may comprise receiving, from a personal computing device associated with an identity, a software identifier associated with access-limited software available on an endpoint computing resource, wherein the software identifier was obtained by the personal computing device from the endpoint computing resource through short-range communications; identifying a tenant identifier associated with the identity; identifying a prompt to activate the access-limited software available on the endpoint computing resource; determining that the identity is permitted to utilize the access-limited software based on at least the software identifier and tenant identifier; and enabling, based on the determining, activation of the access-limited software for use by the identity at the endpoint computing resource.

According to a disclosed embodiment, the short-range communications include wireless communications between the personal computing device and the endpoint computing resource.

According to a disclosed embodiment, the software identifier was obtained by the personal computing device by optically scanning an encoded visible code displayed at the endpoint computing resource.

According to a disclosed embodiment, the software identifier and tenant identifier are received in a single communication from the personal computing device.

According to a disclosed embodiment, the prompt to activate is based on the receiving of the software identifier.

According to a disclosed embodiment, the prompt to activate is based on a communication from the endpoint computing resource.

According to a disclosed embodiment, the software identifier is generated by the endpoint computing resource.

According to a disclosed embodiment, the access-limited software is a software-based service.

According to a disclosed embodiment, the activation of the access-limited software enables the endpoint computing resource to perform the software-based service.

According to a disclosed embodiment, the activation of the access-limited software is performed on a just-in-time basis, wherein prior to the activation the identity is unable to utilize the access-limited software.

According to another disclosed embodiment, there may be a computer-implemented method for securely and efficiently enabling activation of access-limited software to permitted identities. The method may comprise receiving, from a personal computing device associated with an identity, a software identifier associated with access-limited software available on an endpoint computing resource, wherein the software identifier was obtained by the personal computing device from the endpoint computing resource through short-range communications; identifying a tenant identifier associated with the identity; identifying a prompt to activate the access-limited software available on the endpoint computing resource; determining that the identity is permitted to utilize the access-limited software based on at least the software identifier and tenant identifier; and enabling, based on the determining, activation of the access-limited software for use by the identity at the endpoint computing resource.

According to a disclosed embodiment, the software identifier is a universally unique identifier.

According to a disclosed embodiment, the endpoint computing resource is configured to generate one or more cryptographic keys.

According to a disclosed embodiment, the method further comprises receiving from the endpoint computing device at least one of the one or more cryptographic keys.

According to a disclosed embodiment, the method further comprises receiving a signed communication from the endpoint computing resource and validating the signed communication using the received at least one of the one or more cryptographic keys.

According to a disclosed embodiment, the signed communication is received after the activation of the access-limited software.

According to a disclosed embodiment, the signed communication is received as part of a communication from the access-limited software to a backend system.

According to a disclosed embodiment, the method further comprises: receiving a request associated with a second identity for activation of the access-limited software; determining that the second identity is not permitted to utilize the access-limited software; and declining to activate the access-limited software for use by the second identity.

According to a disclosed embodiment, the method further comprises disregarding the request associated with the second identity.

According to a disclosed embodiment, the method further comprises taking a control action for at least one of: the second identity, the endpoint computing resource, or the access-limited software.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of securely and efficiently enabling activation of access-limited software to permitted identities described herein overcome several technological problems in the art. As discussed further below, users of computing devices may activate software on their devices without requiring the participation of a system administrator, although in some embodiments an administrator may participate (e.g., to activate software or patches on servers, routers, switches, or other sensitive or complex resources, etc.). The activation process may be just-in-time, meaning that the activation is dynamically performed based on an interaction between the endpoint and the user's personal computing device, and before the activation is performed the software is inactive or unusable for the user.

Further, according to the disclosed techniques software activation may be achieved without requiring customized setup files on the computing devices that run the software. The disclosed techniques further allow for activation of various types of software, including entire programs, operating systems, patches, updates, fixes, upgrades, etc. In embodiments involving software services (e.g., devices that require software activation to operate initially, such as televisions, smart home appliances, connected vehicles, and more), the initialization of the device may be performed through the disclosed techniques.

Additionally, as discussed further below, the disclosed techniques improve security and efficiency not only for endpoint and client resources, but also for backend resources (e.g., servers, databases, etc.). Because the disclosed techniques permit backend resources to validate communications from such resources (e.g., based on cryptographic signatures), valid communications may be processed while invalid communications may be disregarded or reported for security analysis. In this manner, backend resources are protected from unauthorized and potentially malicious communications, and also experience lightened network load.

Reference will now be made in detail to the disclosed embodiments, examples of which are illustrated in the accompanying drawings.

Figure 1:
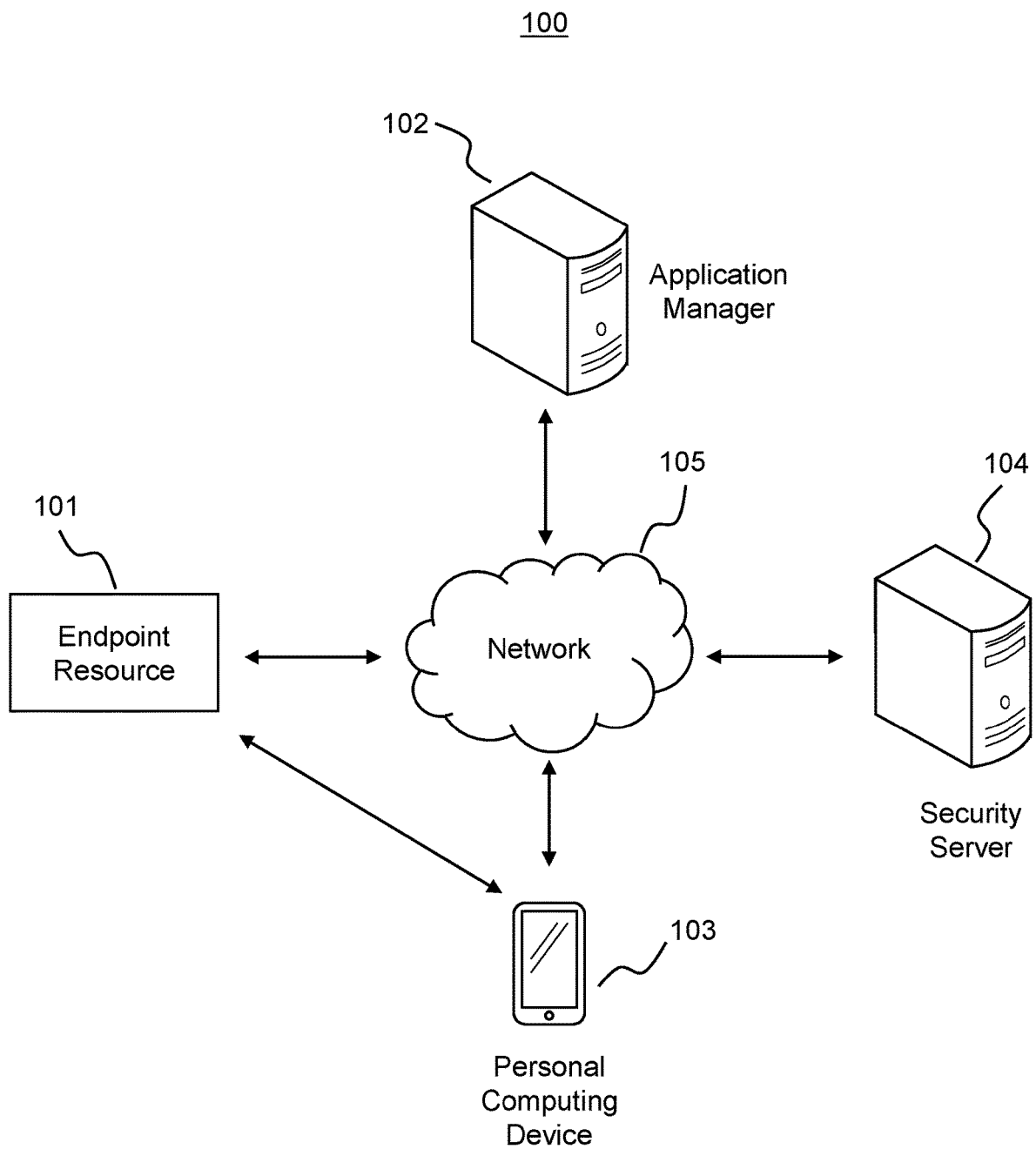
FIG. 1 is a block diagram of an exemplary system for securely and efficiently enabling activation of access-limited software to permitted identities in accordance with disclosed embodiments.

FIG. 1 is a block diagram of an exemplary system 100 for securely and efficiently enabling activation of access-limited software to permitted identities. As described further below, system 100 may include one or more endpoint resources 101, application managers 102, personal computing devices 103, and security servers 104, each of which may communicate directly and/or via network 105.

Endpoint resource 101 may be a computing resource that is configured to run applications or software (e.g., operating systems, programs, agents, code, patches, upgrades, fixes, etc.) that is either installed directly on endpoint resource 101 or provided externally (e.g., from application manager 102 or security server 103). In some embodiments endpoint resource 101 may be a server, gateway, switch, router, personal computer, laptop, portable device, or other resource in an enterprise network, campus network, home network, or other network that is deployed to host such software. In further embodiments, endpoint resource 101 may be a virtual machine (e.g., based on AWS™, Azure™, IBM Cloud™, etc.), container instance (e.g., Docker™ container, Java™ container, Windows Server™ container, etc.), or other virtualized instance. In additional embodiments, endpoint resource 101 may be an IoT device, such as a network-connected appliance, vehicle, lighting, thermostat, room access controller, building entry controller, parking garage controller, sensor device, etc. Exemplary components of endpoint resource 101 are further discussed below in connection with FIG. 2B.

As discussed further below, personal computing device 103 may be used to participate in an initialization or activation process for software on endpoint resource 101. In various embodiments, personal computing device 103 may be one or more computing devices with hardware and software configured to receive, decode, and process machine-readable codes from, or otherwise communicate in a short-range manner with, endpoint resource 101. For example, personal computing device 103 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other types of devices capable of processing and/or receiving data. Exemplary components of personal computing device 103 are further discussed below in connection with FIG. 2A.

As illustrated in FIG. 1, in some embodiments personal computing device 103 may communicate directly with endpoint resource 101. For example, such direct communications may be short-range wireless communications (e.g., NFC, RFID, Bluetooth™, Bluetooth™ low energy, infrared, etc.). In further embodiments, such direct communications may include audible communications (e.g., based on a loudspeaker and microphone), light-based communications, vibration-based communications, or other types of local and wireless communications. In further embodiments, such direct communications may be wired (as opposed to wireless) communications (e.g., using USB, Ethernet, Firewire, eSATA, etc.). As discussed further below, communications between personal computing device 103 and endpoint resource 101 may involve machine-readable codes encoding certain information (e.g., unique software identifiers, tenant identifiers, etc.) used in the initialization or activation of software on endpoint resource 101.

In further embodiments, personal computing device 103 may communicate indirectly with endpoint resource 101 via network 105. Such communications may take place across various types of networks 105, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or various other types of network communications. In some embodiments, the communications may take place across two or more of these forms of networks and protocols. Like the direct communications noted above, communications between personal computing device 103 and endpoint resource 101 via network 105 may involve machine-readable codes encoding certain information (e.g., software identifier, tenant identifier, etc.).

In some embodiments, as discussed further below, when endpoint resource 101 transmits or makes available a machine-readable code (e.g., QR code, barcode, encoded image, etc.) to personal computing device 103, the code is made available to a display medium for personal computing device 103 to read. For example, the display medium may be a webpage (e.g., HTML-based, JavaScript-based, Flash™-based, etc.) being accessed by personal computing device 103, an application interface being displayed on personal computing device 103, a physical medium accessible to personal computing device 103 (e.g., a television screen, display screen, projected image, printed card, printed sticker, printed page, etc.), or other display media. In such situations, the machine-readable code may be transmitted from endpoint resource 101 to the display medium accessible to personal computing device 103. In alternate embodiments, the code or data being transmitted from endpoint resource 101 to personal computing device 103 is transmitted by sound (e.g., a loudspeaker of endpoint resource 101), by NFC communications (e.g., Bluetooth™, RFID, etc.), or through other techniques.

Application manager 102 may be a sever, database, or other computing resource configured to provide software to endpoint resources 101. For example, in environments where endpoint resource 101 is part of an enterprise network, application manager 102 may be an administrator computer or database configured to store access-limited software. Alternatively, application manager 102 may be separate from the enterprise network (e.g., hosted by a third-party, or in the cloud). Application manager 102 may in some embodiments be configured to track which instances of software it has provisioned to particular endpoint resources 101 (e.g., tracked based on identities of endpoint resources 101, tracked in terms of permitted license "seats" or counts, tracked in terms of use of the software, etc.). For example, if a particular licensed application maintained by application manager 102 is permitted to be used by only 200 endpoint resources 101, application manager 102 may keep track of which endpoint resources 101 have received the application (or have activated the application) so that the limit of 200 is not exceeded. As another example, if the licensed application has a permitted usage limitation of 100 GB/month, application manager 102 may keep track of each endpoint resource 101's use of the application, to gauge whether the 100 GB/month limit on usage of the application is reached. Various other implementations of application manager 102 are possible as well.

In some embodiments, system 100 may not include application manager 102 as a separate computing resource. For example, in some embodiments the above functions of application manager 102 may be performed by security server 104. In other embodiments, application manager 102 and security server 104 are separate resources.

Security server 104 may be implemented as various types of severs or other computing resources, located either in the same network environment as endpoint resource 101 or in a separate (e.g., cloud-based) network environment. As discussed further below, security server 104 may function to initialize or activate software on endpoint resource 101. For example, security server 104 may be configured to register identities or users (e.g., based on account name, user identifiers, IP address, MAC address, device identifiers, etc.) of personal computing device 103, who are seeking to access endpoint resources 101. Accordingly, security server 104 may maintain lists (e.g., tables, or database entries) associating users or identities of personal computing devices 103 with particular endpoint resources 101, with particular applications running on endpoint resources 101 (e.g., based on a software identifier), with particular "seat" or tenant identifiers, or with other identifying data. In addition, as discussed further below, security service 104 may be configured to receive and validate software and tenant identifiers (e.g., as part of the activation process), and to verify signatures of incoming communications directed to security server 104.

Figure 2A:
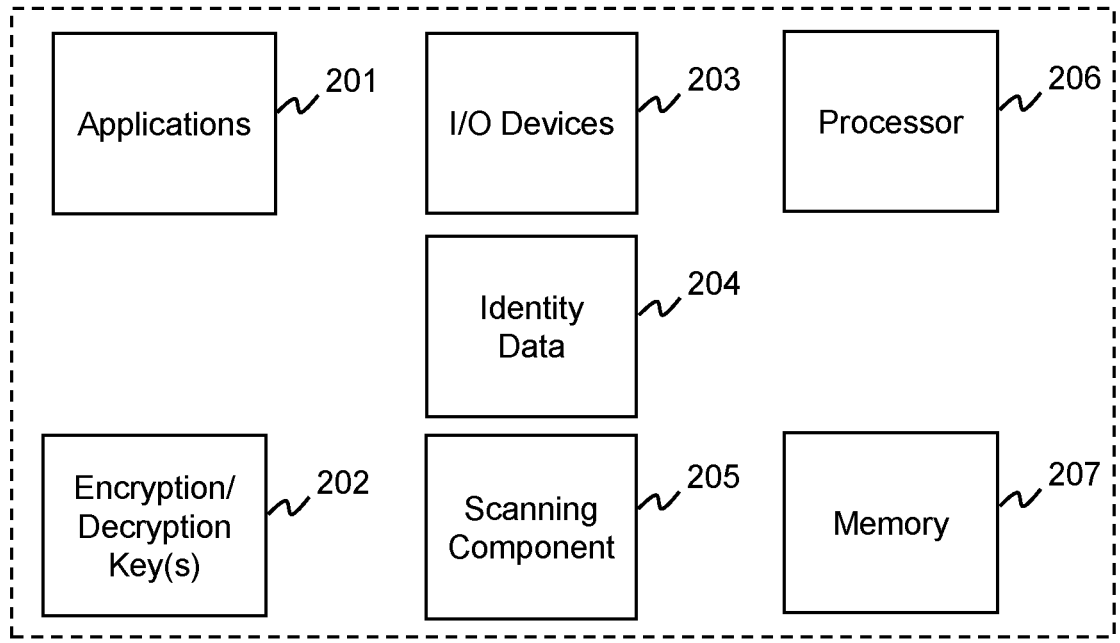
FIG. 2A is a block diagram of exemplary system components of a personal computing device in accordance with disclosed embodiments.
Figure 2B:
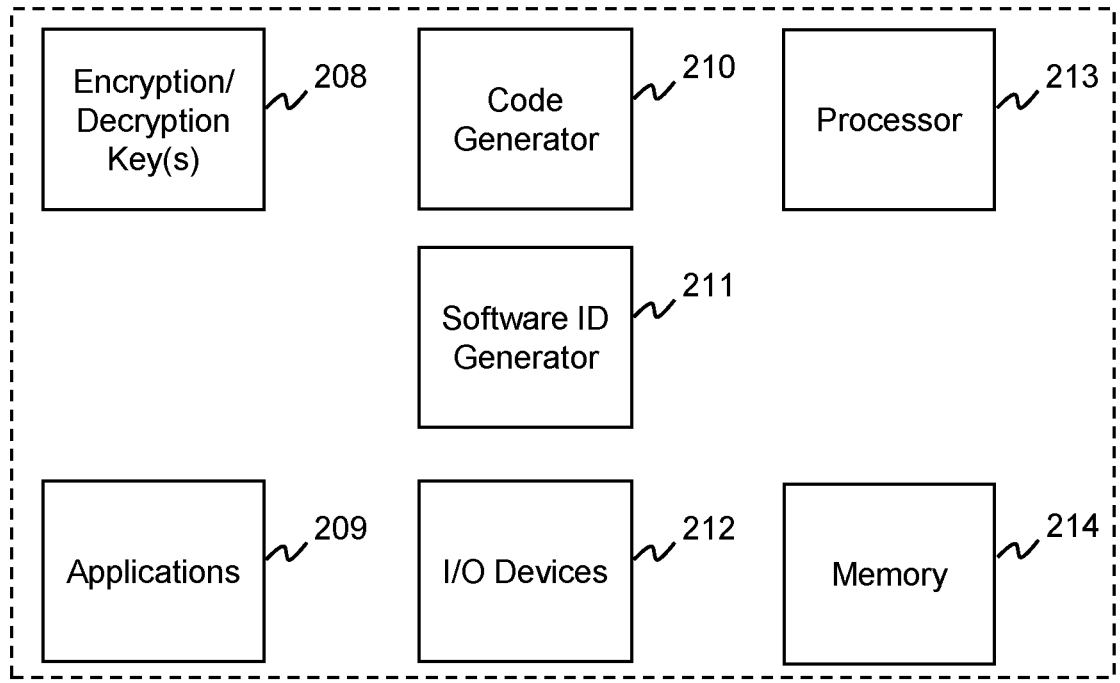
FIG. 2B is a block diagram of exemplary system components of an endpoint resource in accordance with disclosed embodiments.

FIGS. 2A and 2B are, respectively, block diagrams of exemplary components of a personal computing device 103 and an endpoint resource 101. Not all of the illustrated components are required to implement the functionality discussed below, and additional components may be added consistent with the discussed functionality as well.

Consistent with FIGS. 2A and 2B, personal computing device 103 and endpoint resource 101 may each include components such as one or more processor 206/213. Processor (or processors) 206/213 may include one or more data or software processing devices. For example, processor 206/213 may take the form of, but is not limited to, a microprocessor, embedded processor, or the like, or may be integrated in a system on a chip (SoC). Furthermore, according to some embodiments, processor 206/213 may be from the family of processors manufactured by Intel®, AMD®, Qualcomm®, Apple®, NVIDIA®, or the like. Processor 206/213 may also be based on the ARM architecture, a mobile processor, or a graphics processing unit, etc. In some use cases, processor 206 may be a server processor while processor 213 may be a mobile device processor. The disclosed embodiments are not limited to any particular type of processor configured in personal computing device 103 and endpoint resource 101.

Personal computing device 103 and endpoint resource 101 may also each include input/output devices 203/212. I/O devices 203/212 may include data entry interfaces (e.g., touchscreens, stylus-sensitive screens, keyboards, cursor devices, etc.), data exchange interfaces (e.g., USB, Firewire™, etc.), audio devices (e.g., speaker, microphone, etc.), and network interfaces based on a variety of network protocols (e.g., Ethernet, cellular, WiFi, Bluetooth®, RFID, NFC, RF, infrared, etc.). Further, personal computing device 103 and endpoint resource 101 may each include one or more memories 207/214. Memory (or memories) 207/214 may include one or more storage devices or media configured to store instructions used by processors 206/213, respectively, to perform functions related to the disclosed embodiments. Memory 207/214 may be configured to store software instructions, such as applications 201/209, that perform one or more operations when executed by the processor 206/213 to participate in a process of initializing or activating software on endpoint resource 101, as discussed in connection with FIGS. 3A-J and 4 below. The disclosed embodiments are not limited to particular software types or devices configured to perform dedicated tasks. For example, memory 207/214 may store a single program, such as a user-level application 201/209, that performs the functions of the disclosed embodiments, or may comprise multiple software programs. Additionally, the processor 206/213 may in some embodiments execute one or more programs (or portions thereof). Furthermore, the memory 207/214 may include one or more storage devices or media configured to store data for use by the applications 201/209. In some cases, memory 207 of personal computing device 103 may be, or include, a secure mobile memory environment (e.g., ARM TrustZone™, Apple Secure Enclave™, Google Titan M™, Android Trusted Execution Environment™, etc.). In such embodiments, the secure memory environment may also have a separate secure processor for performing some or all of the functionality discussed below.

Personal computing device 103 may also include identity data 204, which may be stored in memory 207. Identity data 204 may be, for example, user credentials (e.g., name, account name, employee ID, organization, etc.), a digital certificate (e.g., X.509 certificate), a user ID, a government issued number (e.g., social security number), a tenant identifier (e.g., identifying the user as entitled to a "seat" for licensed software), or other identifying data for the identity. In embodiments where personal computing device 103 has a secure memory or processing environment (e.g., ARM TrustZone™, Apple Secure Enclave™, Google Titan M™, Android Trusted Execution Environment™, etc.), identity data 204 may optionally be stored in that environment. Further, in some embodiments identity data 204 may be encrypted and users may be required to biometrically identify themselves in order to decrypt the identity data 204.

As shown in FIGS. 2A and 2B, personal computing device 103 may also have a scanning component 205, which is configured to scan codes generated by code generator 210 of endpoint resource 101. For example, code generator 210 may be an application configured to generate a scannable or machine-readable code that encodes information (e.g., software identifier, tenant identifier, etc.). For example, code generator 210 may be a software code, a script, or application stored on memory 214 and/or executed by processor 213. Code generator 210 may be capable of encoding information according to a variety of different formats, such QR code (e.g., using ISO/IEC 18004:2015), data matrix code, Aztec code, PDF417 code, MicroPDF417 code, CodaBlock-F code, MaxiCode code, Microsoft Tag code, Shotcode code, encoded image, geometric pattern, color pattern, etc. In some embodiments, code generator 210 may be configured to generate an audible code that may be produced via a loudspeaker (e.g., I/O device 212) and received via a microphone (e.g., I/O device 203) of personal computing device 103. Other encoding formats are possible as well. Correspondingly, scanning component 205 may be configured to optically scan, read, or otherwise detect the codes generated by code generator 210 and made available from endpoint resource 101 to personal computing device 103. That is, scanning component 205 may be software code, a script, or an application stored on memory 207 and/or executed by processor 206 that corresponds to the coding techniques used by code generator 210.

Personal computing device 103 and endpoint resource 101 may also have various applications 201/209, which may be stored in memories 207/214 and executed by processors 206/213. For example, personal computing device 103 may run an application or agent configured to detect encoded machine-readable codes generated by endpoint resource 101, decode the codes (e.g., via scanning component 205 or I/O 203), retrieve locally stored identity data (e.g., identity data 204), and transmit data (e.g., software identifier and tenant identifier) to security server 104. In addition, applications 201 may include one or more network-based applications configured to interact with endpoint resource 101 over a secure session. Such applications 201 may take various forms, such as business applications, personal applications, social media applications, and more. Correspondingly, applications 209 may include an endpoint application or agent configured to generate or receive software identifiers, make available encoded machine-readable codes to personal computing device 103, and participate in an initialization or activation process for an application on endpoint resource 101. The operations of applications 201 and 209 are further discussed below in conjunction with FIGS. 3A-J and 4.

Personal computing device 103 and endpoint resource 101 may additionally each store one or more cryptographic encryption or decryption keys 202/208. For example, in some embodiments endpoint resource 101 may generate or retrieve asymmetric key pairs (e.g., generated using algorithms such as RSA, Transport Layer Security (TLS), S/MIME, PGP, GPG, or various other algorithms) or symmetric keys (e.g., generated using algorithms such as Twofish, DES, Blowfish, AES, Serpent, etc.). Endpoint resource 101 may then, as discussed further below, transmit a key (e.g., a public or symmetric key) to security server 104. In some embodiments, the key may be transmitted together with a software identifier associated with software on endpoint resource 101 and a tenant identifier associated with an identity seeking access to the software. Security server 104 may then, in turn, store the received key in association with the software identifier, tenant identifier, and/or any other identifying data regarding the user (e.g., IP address, MAC address, account name, etc.). For example, security server 104 may maintain lists, tables, or databases associating particular cryptographic keys it has received from endpoint resource 101 with particular software identifiers, tenant identifiers, and other identity-identifying data. As discussed further below, when security server 104 receives signed communications from endpoint resource 101, it may retrieve the stored cryptographic key (e.g., in association with a particular software identifier corresponding to software being used on endpoint resource 101, or in association with a particular tenant identifier corresponding to a user or identity using the software) and use the key to validate the signature of the communications.

FIG. 2B further illustrates endpoint resource 101 including a software identifier generator 211. As discussed further below, software identifier generator 211 may be an application or agent configured to generate unique software identifiers for software (e.g., operating systems, applications, agents, patches, upgrades, fixes, code, etc.) on endpoint resource 101. For example, software identifier generator 211 may be configured to generate a globally unique identifier (GUID), universally unique identifier (UUID), random string of numbers and/or letters, or other types of unique data elements to identify a particular program. As discussed below, this unique software identifier may be made available to personal computing device 103 through an encoded machine-readable code or otherwise transmitted (e.g., via Bluetooth, RFIC, etc.) to personal computing device 103. While FIG. 2B illustrates software identifier generator 211 as being a component of endpoint resource 101, in other embodiments, endpoint resource 101 does not include a software identifier generator 211. For example, in some embodiments the unique software identifier may be received at endpoint resource 101 from an external source (e.g., from application manager 102 or security server 104).

Figure 3A:
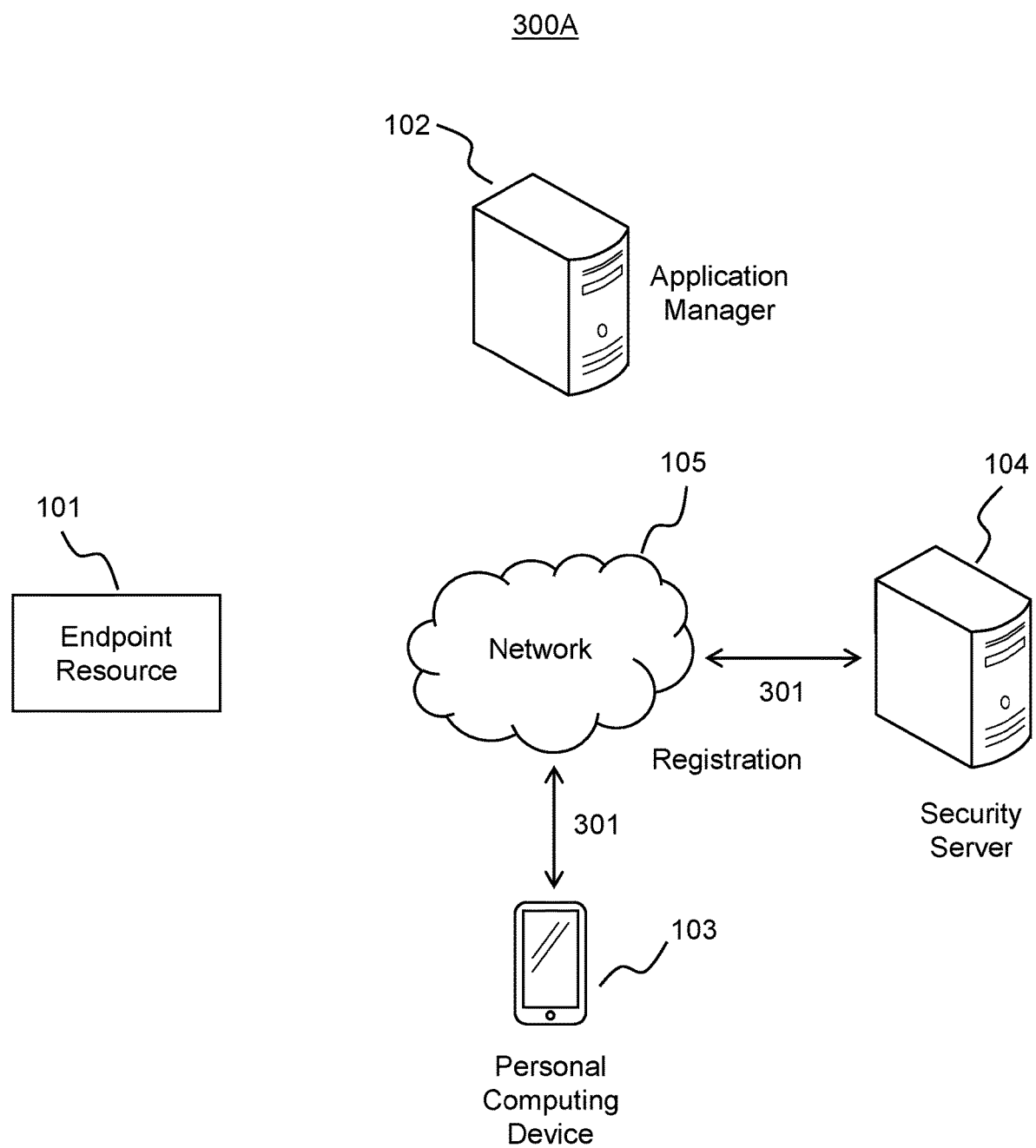
FIG. 3A is a block diagram of an exemplary system where a personal computing device is registered with a security server in accordance with disclosed embodiments.

FIG. 3A is a block diagram of an exemplary system 300A where a personal computing device 103 is registered with a security server 104. In accordance with system 300A, identity data associated with an owner or operator of personal computing device 103 may be passed in transmission 301 to security server 104 for storage. The identity data may be, for example, a name, username, account name, IP address, MAC address, device identifier (e.g., mobile identification number (MIN) associated with personal computing device 103), or other identifying data. In some embodiments, the registration process and transmission 301 occur after personal computing device 103 has been provisioned. The transmission 301 may be initiated, for example, by an application (e.g., application 201) installed on personal computing device 103. The application may initiate transmission 301 upon various events, such as the application 201 being initially installed or configured, upon the user of personal computing device 103 being invited to register themselves, upon the user attempting to access software on endpoint resource 101, etc. In alternate embodiments, the registration process may occur without a transmission 301. For example, the identity data may be retrieved or provided to security server 104 from an external source (e.g., identity database).

Once security server 104 receives the identity data, it may store the identity data for later use. As discussed further below, the identity data may be stored in a list, table, or database in association with other data, such as a software identifier, tenant identifier, cryptographic key provided by endpoint resource 101, etc. This information may then be used in the process of initializing or activating software on endpoint resource 101, as well as validating signed communications from endpoint resource 101, consistent with the disclosure below.

Figure 3B:
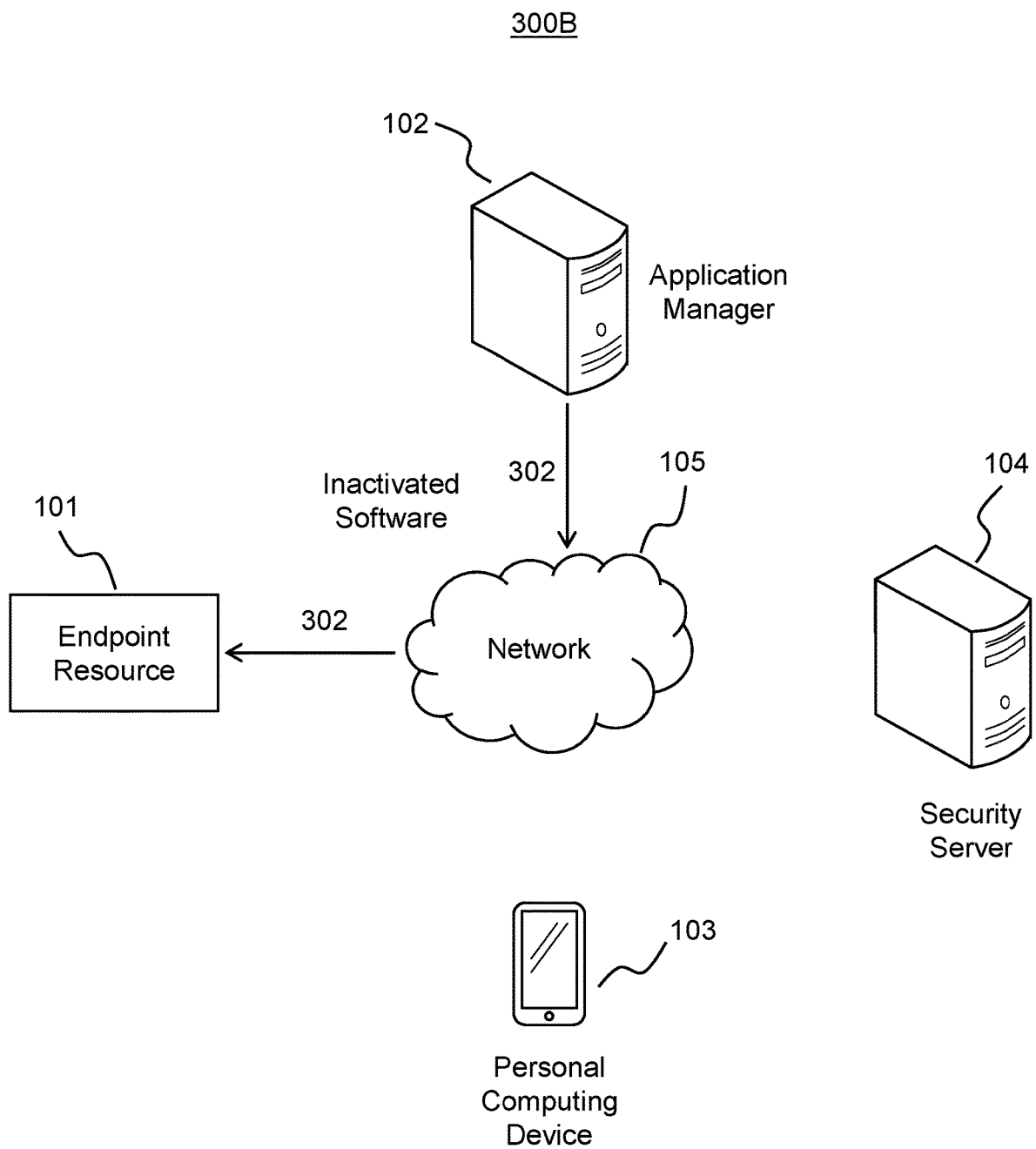
FIG. 3B is a block diagram of an exemplary system where an endpoint resource receives an inactivated version of software in accordance with disclosed embodiments.

FIG. 3B is a block diagram of an exemplary system 300B where an endpoint resource 101 receives an inactivated version of software. As discussed above, some embodiments may involve an application manager 102, which is configured to provision software (e.g., operating systems, programs, agents, upgrades, patches, fixes, code, etc.) to endpoint resource 101. This may include, for example, transmitting in transmission 302 a copy of the software to endpoint resource 101. Alternatively, in some embodiments this may include transmitting in transmission 302 a link or pointer (e.g., uniform resource locator (URL), lightweight directory access protocol (LDAP) address, file transfer protocol (FTP) address, IP address, etc.) to a storage location where the software is available for download by endpoint resource 101. For example, the link or pointer may direct the endpoint resource 101 to download the software from a cloud-based storage environment (e.g., storage-as-a-service environment) or application server.

In some embodiments, as noted above, system 300B may not include a separate application manager 102. Instead, in such embodiments security server 104 may perform the functions of the application manager 102. Accordingly, in such embodiments security server 104 may be configured to provide copies of software, or links or pointers to locations where the software is stored, to endpoint resource 101.

In accordance with system 300B, the software that is initially provided to or downloaded by endpoint resource 101 may be in an inactivated state. For example, the software may be prohibited from fully executing, or executing at all, until it has been activated. Techniques for activating the software are discussed further below. If a user attempted to run the software on endpoint resource 101, they may be prohibited from doing so. For example, the software may not execute at all, or the software may display an initial prompt confirming that full execution of the software is prohibited until the software is activated.

Figure 3C:
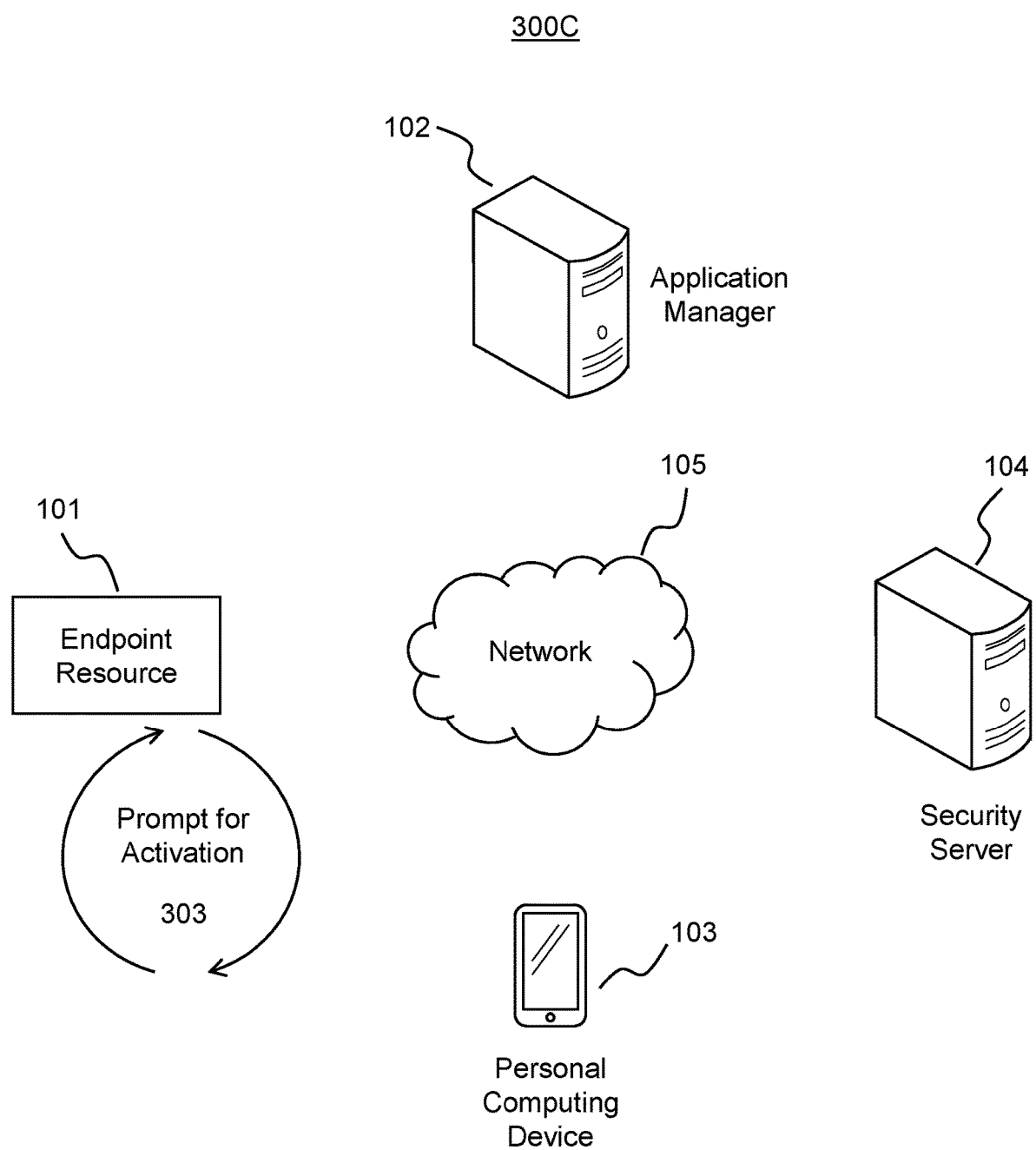
FIG. 3C is a block diagram of an exemplary system where the endpoint resource is prompted to activate the inactivated software in accordance with disclosed embodiments.

FIG. 3C is a block diagram of an exemplary system 300C where the endpoint resource 101 is prompted to activate the inactivated software. In some embodiments, the prompt 303 may be a user of endpoint resource 101 attempting to run the software (e.g., attempting to execute the software). Alternatively, the prompt 303 may in some embodiments be the initial download of the software by endpoint resource 101.

As an illustration, in situations where endpoint resource 101 is a personal computer and the inactivated software is a program, the prompt may occur when a user of endpoint resource 101 attempts to open the program on endpoint resource 101. Further, in situations where endpoint resource 101 is an IoT device (e.g., network-connected television, network-connected telephone, network-connected surveillance camera, etc.), prompt 303 may include a user initially powering on the device. For example, upon powering on the device, an application running on the device (e.g., application 209) may interpret the power-on, or running of an initial setup program, as a prompt 303. As another example, if endpoint resource 101 is a server and the inactivated software is a new server patch, the prompt 303 may be the server receiving the patch (e.g., from application manager 102) or an administrator receiving a notification that the patch is available for the server.

Figure 3D:
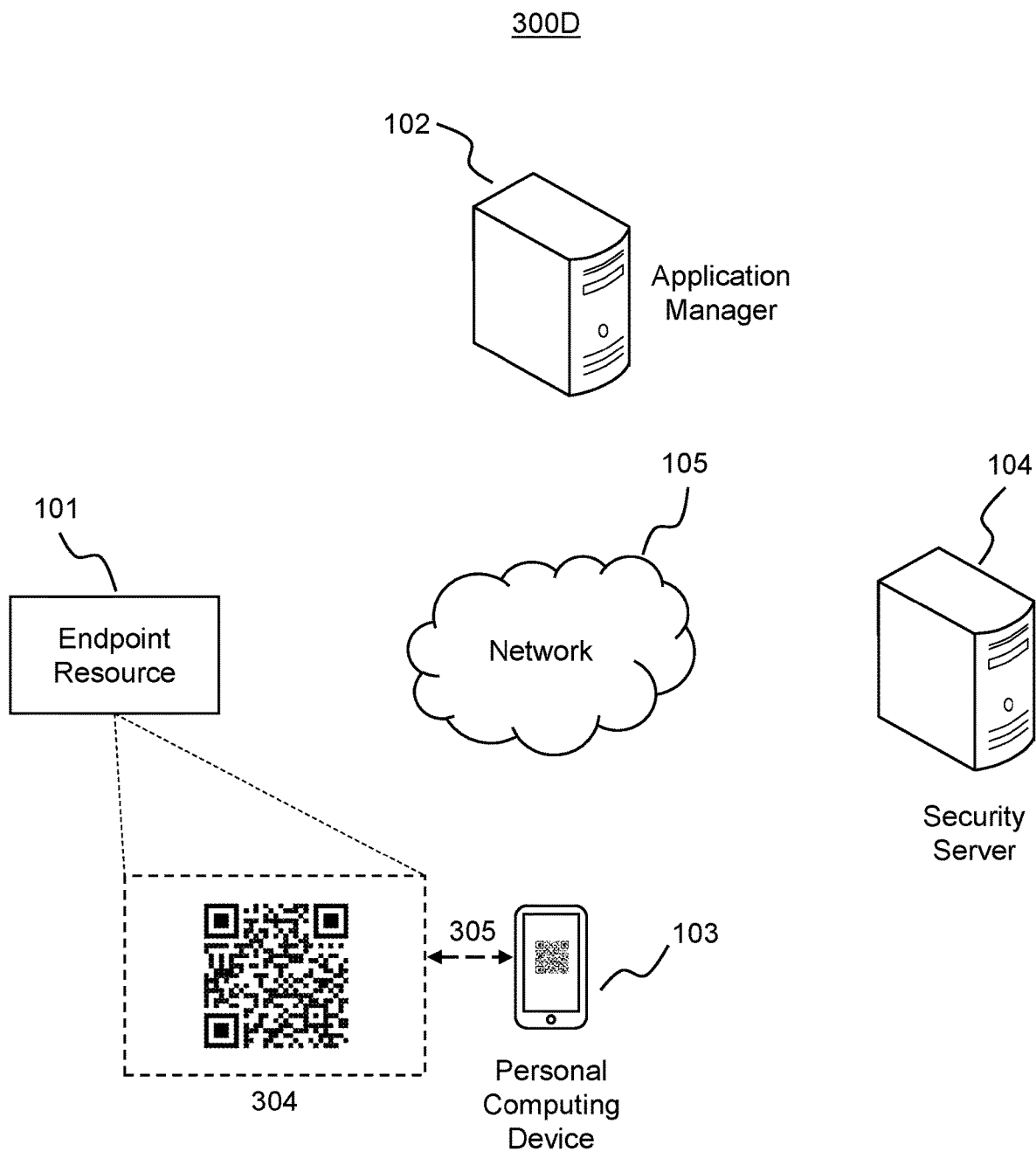
FIG. 3D is a block diagram of an exemplary system where the endpoint resource produces a scannable code for display to the personal computing device in accordance with disclosed embodiments.

FIG. 3D is a block diagram of an exemplary system 300D where the endpoint resource 101 produces a scannable code 304 for display to the personal computing device 103. As discussed above, the scannable code 304 may be generated through an application (e.g., code generator 210) running on endpoint resource 101. The scannable code may be generated, for example, based on the prompt 303 of FIG. 3C.

The scannable code 304 may be created in accordance with a variety of encoding formats, such as QR (e.g., using ISO/IEC 18004:2015), data matrix, Aztec, PDF417, MicroPDF417, CodaBlock-F, MaxiCode, Microsoft Tag, Shotcode, encoded image, geometric pattern, color pattern, etc. The scannable code 304 may be encoded with particular data, such as a software identifier. The software identifier may uniquely identify the particular software installed on endpoint resource 101 that is being activated. In some embodiments, the software identifier may be provisioned together with the software (e.g., from application manager 102), while in other embodiments the software identifier may be generated dynamically by endpoint resource 101. For example, the software identifier may be a globally unique identifier (GUID), universally unique identifier (UUID), randomly generated character string, etc. In the example of FIG. 3D, the scannable code 304 encodes a software identifier of "250fd174-a9d7-4290-a623-f16f9f6a7c87."

Personal computing device 103 may then be able to scan the scannable code 304 in a scanning operation 305. For example, endpoint resource 101 may display the scannable code 304 as part of a web page transmitted to personal computing device 103, as part of an application interface being accessed on personal computing device 103, or through other applications. Further, in some embodiments the scannable code 304 is displayed in the environment of personal computing device. For example, the scannable code 304 may be displayed on a screen or monitor of endpoint resource 101, an external screen or monitor, through a projection of scannable code 304, through a printed medium (e.g., card, sticker, etc.), or through other display media. Once personal computing device 103 scans the scannable code 304 in operation 305 (e.g., using scanning component 205), it may decode the scannable code 304 (e.g., using an application 201) to yield the encoded data. In the example of FIG. 3D, personal computing device 103 may decode the scannable code 304 to produce the software identifier of "250fd174-a9d7-4290-a623-f16f9f6a7c87." As discussed above, this software identifier may be associated with particular software installed (e.g., in an inactivated state) on endpoint resource 101.

Figure 3E:
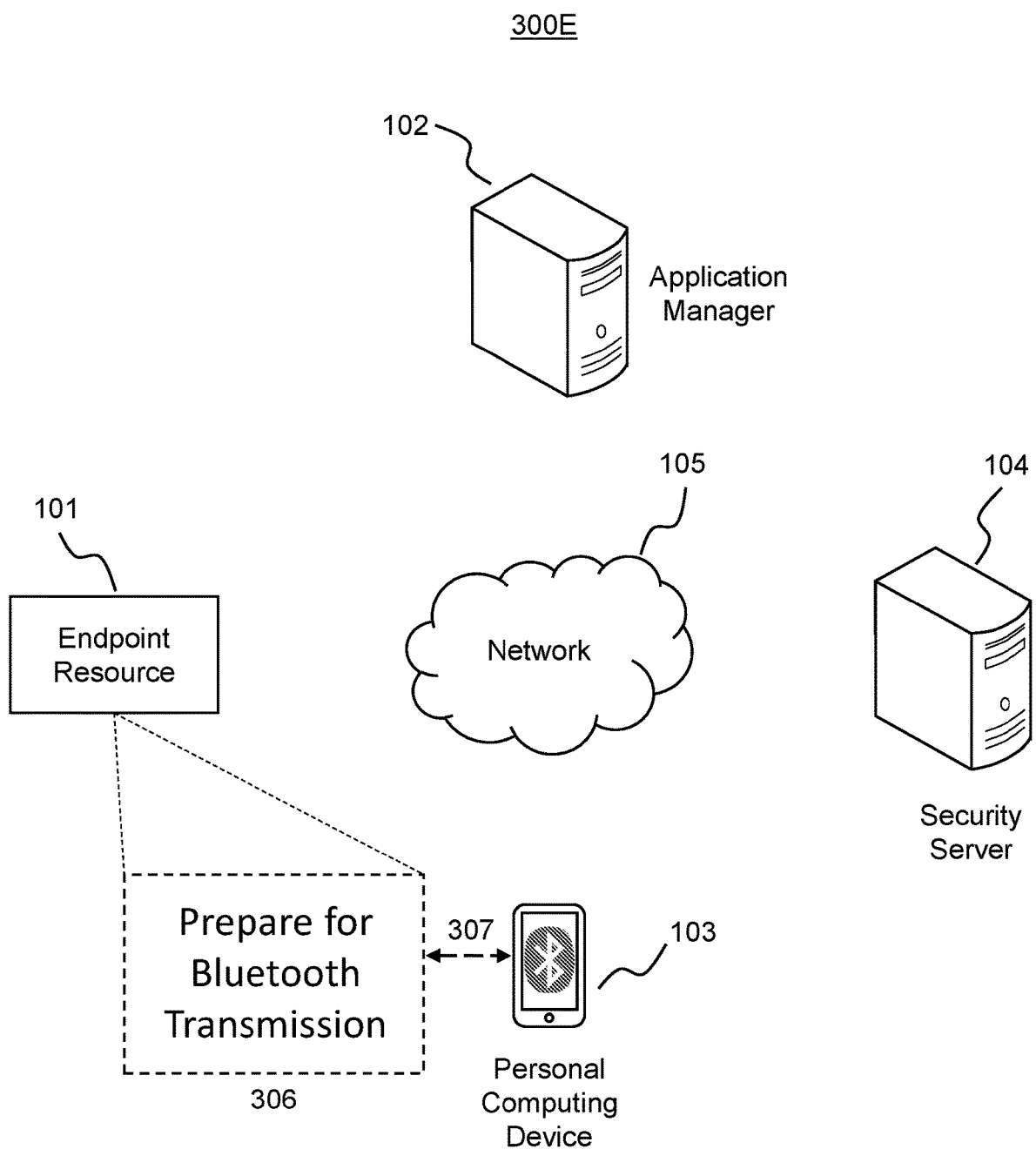
FIG. 3E is a block diagram of an exemplary system where the endpoint resource participates in short-range wireless communications with the personal computing device in accordance with disclosed embodiments.

FIG. 3E illustrates an alternative technique to FIG. 3D. In accordance with FIG. 3E, exemplary system 300E may involve the endpoint resource 101 preparing for short-range wireless communications with the personal computing device 103. As with FIG. 3D, operation 306 may occur in response to the prompt 303 of FIG. 3C.

In operation 306, endpoint resource 101 may transmit via short-range communications (e.g., Bluetooth™, RFID, infrared, NFC, USB, Firewire™, etc.) the software identifier to personal computing device 103 in transmission 307. For example, in some embodiments endpoint resource 101 may display a prompt 306 to personal computing device 103 instructing personal computing device to prepare for a Bluetooth™ transmission from endpoint resource 101 containing the software identifier. In response to the prompt 306, endpoint resource 101 and personal computing device 103 may engage in a pairing process (unless already paired), and establish a connection over which endpoint resource 101 transmits the software identifier to personal computing device 103. Consistent with above embodiments, this transmission may occur using a variety of short-range wired or wireless protocols.

Figure 3F:
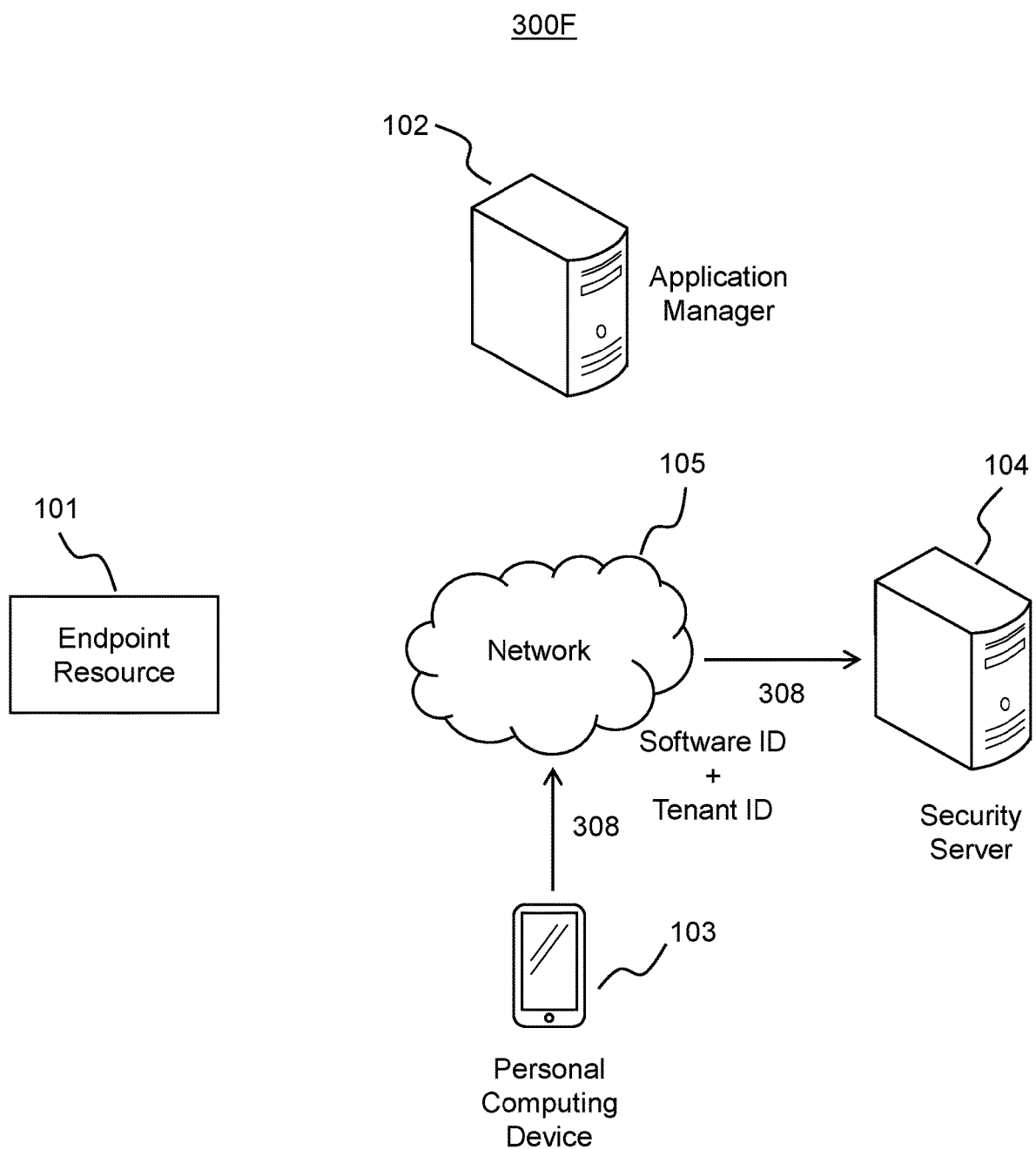
FIG. 3F is a block diagram of an exemplary system where the personal computing device transmits a software identifier and tenant identifier to a security server in accordance with disclosed embodiments.

FIG. 3F is a block diagram of an exemplary system 300F where the personal computing device 103 transmits the received software identifier and tenant identifier to security server 104 in transmission 308. The software identifier may be the software identifier provided from the endpoint resource 101 (e.g., via scannable code 304 or short-range communication). The tenant identifier may be a unique identifier given to the user of personal computing device 103, or potentially to a class of users (e.g., using the same application, or in the same work group) that includes the user of personal computing device 103. As discussed above, the tenant identifier may be provisioned to the user during registration of the user or their personal computing device 103, in accordance with FIG. 3A. While FIG. 3F illustrates personal computing device 103 transmitting the software identifier and tenant identifier together in a single transmission 308, in some embodiments they maybe separately transmitted in separate communications. In accordance with the discussion above, the one or more transmissions comprising transmission 308 may take several forms using various types of network protocols and communication formats.

In some embodiments, when security server 104 receives the software identifier and tenant identifier from personal computing device 103, security server 104 may determine whether the user (e.g., as identified by their tenant identifier) is permitted to access or activate the software on endpoint resource 101 (e.g., based on the software identifier). For example, security server 104 (or application manager 102) may maintain lists, tables, or databases of particular users, as discussed above, which may identify which particular users are accessing particular software on individual endpoint resources 101. Thus, if only 100 users are permitted to access a given program on endpoint resources 101, security server 104 may ensure that only permitted users can access the program and the license count of 100 "seats" or tenants is not exceeded.

In further embodiments, security server 104 (or application manager 102) may further track usage of software on endpoint resource 101. For example, security server 104 may track an amount of time (e.g., minutes, hours, days, etc.) spent by particular users (e.g., based on tenant identifiers) accessing particular programs (e.g., based on software identifiers). Further, security server 104 may track additional usage data, such as actions performed in the software, files downloaded using the software, total bandwidth consumed using the software, etc. In situations where a particular usage threshold is required for a software program on endpoint 101 (e.g., 10 GB/day, or 200 GB/month, etc.), security server 104 may thus track the actual usage of the software by particular users. In accordance with the discussion below, if software on endpoint resource 101 has reached a usage limitation, security server may deny activation or continued use of the software.

Figure 3G:
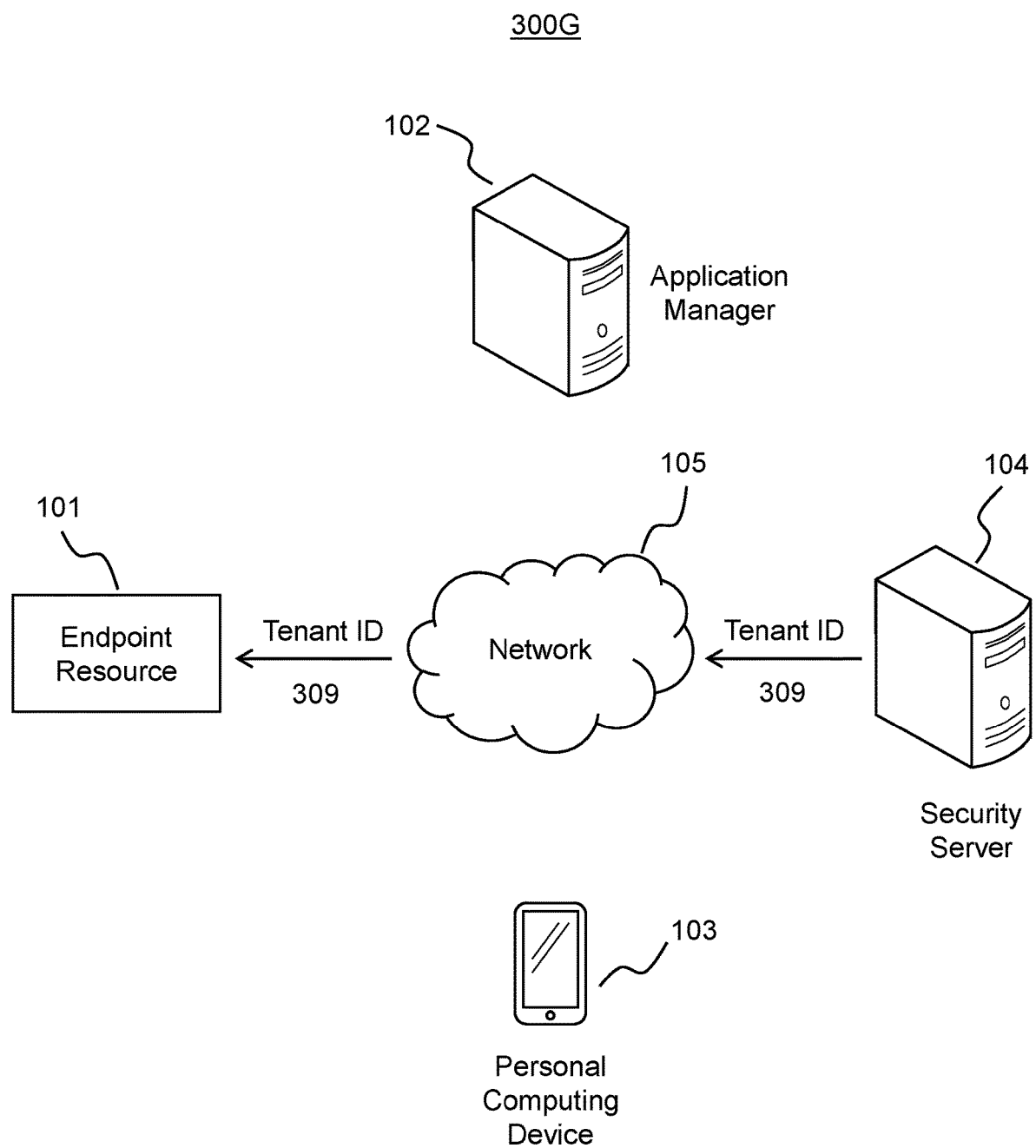
FIG. 3G is a block diagram of an exemplary system where the endpoint resource receives the tenant identifier from the security server in accordance with disclosed embodiments.

FIG. 3G is a block diagram of an exemplary system 300G where the endpoint resource 101 receives the tenant identifier from the security server 104. In some embodiments, system 300G illustrates a process that occurs conditional on security server 104 successfully confirming that a particular user (e.g., based on the received tenant identifier) is permitted to use particular software on endpoint resource 101 (e.g., based on the received software identifier). In such embodiments, if the user is not permitted to access the software on endpoint resource 101, security server 104 may decline the transmit the tenant identifier to endpoint resource 101 or otherwise proceed with activating the software on endpoint resource 101. On the other hand, if the user is permitted, security server 104 may transmit the tenant identifier to endpoint resource 101 in transmission 309.

In some embodiments, security server 104 may perform additional security analyses before providing the tenant identifier 309 to endpoint resource 101. That is, in addition to verifying that the user of personal computing device 103 has a valid "seat" or license to use the software on endpoint resource 101, security server 104 may also gauge whether the user poses a security threat. For example, security server 104 may prompt the user of personal computing device 103 to perform an authentication process (e.g., based username/password, biometric identification, security question prompts, two-factor authentication, etc.). In other situations, a behavioral or activity-based analysis of the user of personal computing device 103 and/or endpoint resource 101 itself may be performed. If suspicious or anomalous activity is detected, security server 104 may determine not to transmit the tenant identifier to endpoint resource 101 in transmission 309. Instead, an alert or report may be generated identifying the potential security vulnerability or risk.

Once endpoint resource 101 has received the tenant identifier from security server 104 in transmission 309, the software being accessed on endpoint resource 101 may become activated. For example, if the software is an operating system or program, it may be permitted to fully execute or limitations on access may be removed. If the software is part of an IoT device or system, the user of personal computing device 103 may then have access to the functionality of the device or system, or the device or system itself may become operational. In some embodiments, the tenant identifier acts as a product activation code or password for the software on endpoint resource 101. If the tenant identifier is verified by the software, the software may be activated, whereas if the tenant identifier is not verified the software may remain in an inactivated state.

In some embodiments, the tenant identifier transmitted in transmission 309 is the actual activation code or initialization code used at endpoint resource 101 to activate or initialize the software. In alternate embodiments, transmission 309 may include the tenant identifier as well as a separate activation or initialization code. In that circumstance, the separate activation or initialization code may be used to activate or initialize the software. In some such embodiments, the separate activation or initialization code may activate or initialize the software only for use by the user having the tenant identifier, and not for other users having different tenant identifiers.

Figure 3H:
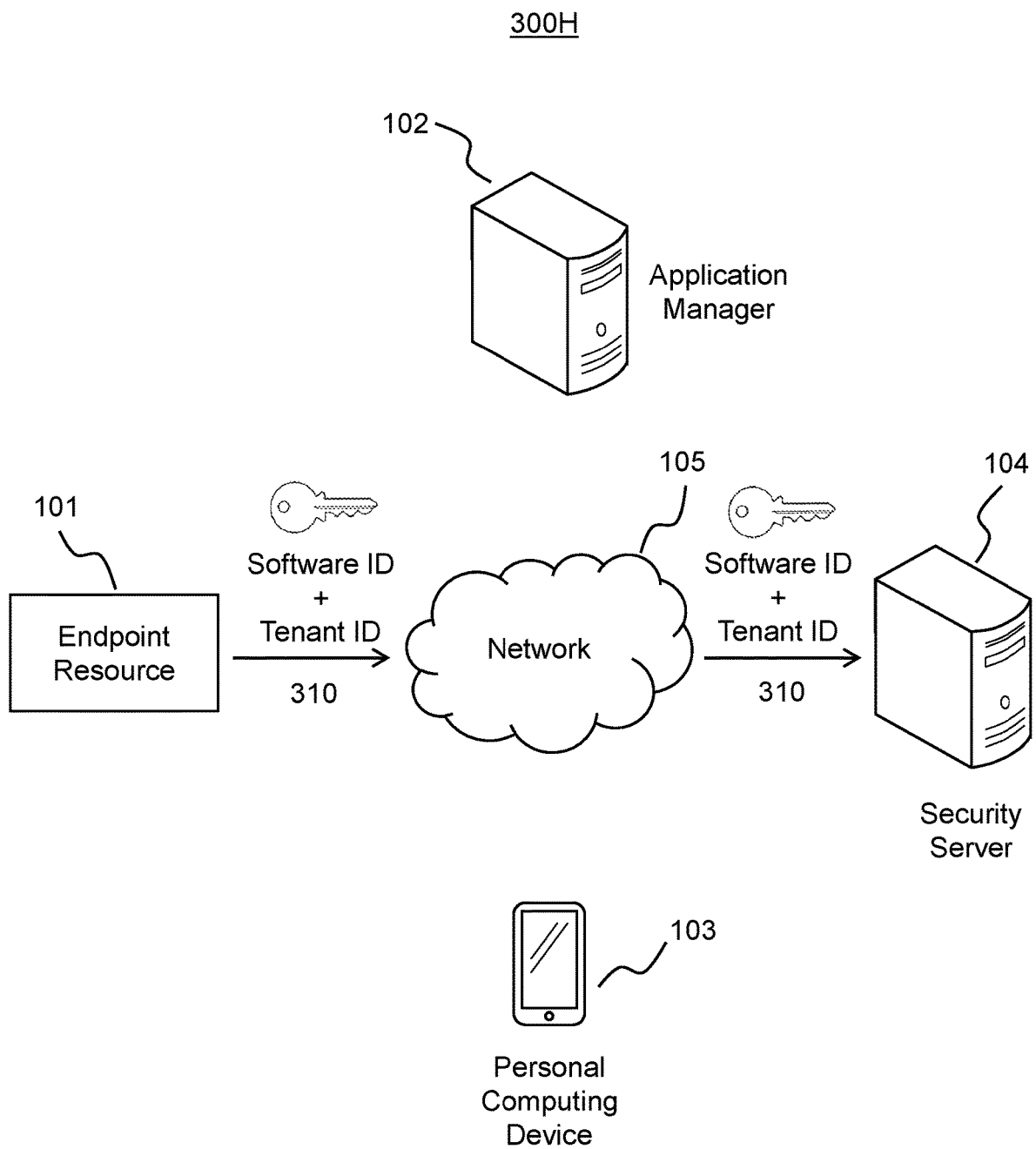
FIG. 3H is a block diagram of an exemplary system where the endpoint resource provides a cryptographic key to the security server in accordance with disclosed embodiments.

FIG. 3H is a block diagram of an exemplary system 300H where the endpoint resource 101 provides a cryptographic key to the security server 104. In accordance with FIG. 3H, endpoint resource 101 may access a previously generated cryptographic key (e.g., from memory 214) or may generate a new cryptographic key (e.g., via encryption/decryption key generator 208). As discussed above, the key may be part of an asymmetric (public/private) key pair (e.g., generated using algorithms such as RSA, Transport Layer Security (TLS), S/MIME, PGP, GPG, or various other algorithms). Alternatively, the key may be a symmetric key (e.g., generated using algorithms such as Twofish, DES, Blowfish, AES, Serpent, etc.). In situations where the cryptographic key is part of an asymmetric key pair, endpoint resource 101 may store the private key locally at endpoint resource 101 (e.g., in association with the tenant identifier and software identifier) and transmit the public key in transmission 310 to security server 104. Correspondingly, in situations where the cryptographic key is a symmetric key, endpoint resource 101 may store a copy of the key locally (e.g., in association with the tenant identifier and software identifier) and transmit a copy of the key in transmission 310 to security server 104. As part of the same transmission 310 containing the cryptographic key, or a separate transmission, endpoint resource 101 may also transmit the tenant identifier and/or software identifier to security server 104. Security server 104 may then store the cryptographic key it received in its list, table, or database in association with the tenant identifier and software identifier. That is, security server 104 may then have a stored list, table, or database linking a particular tenant identifier to a corresponding software identifier and a cryptographic key.

Figure 3I:
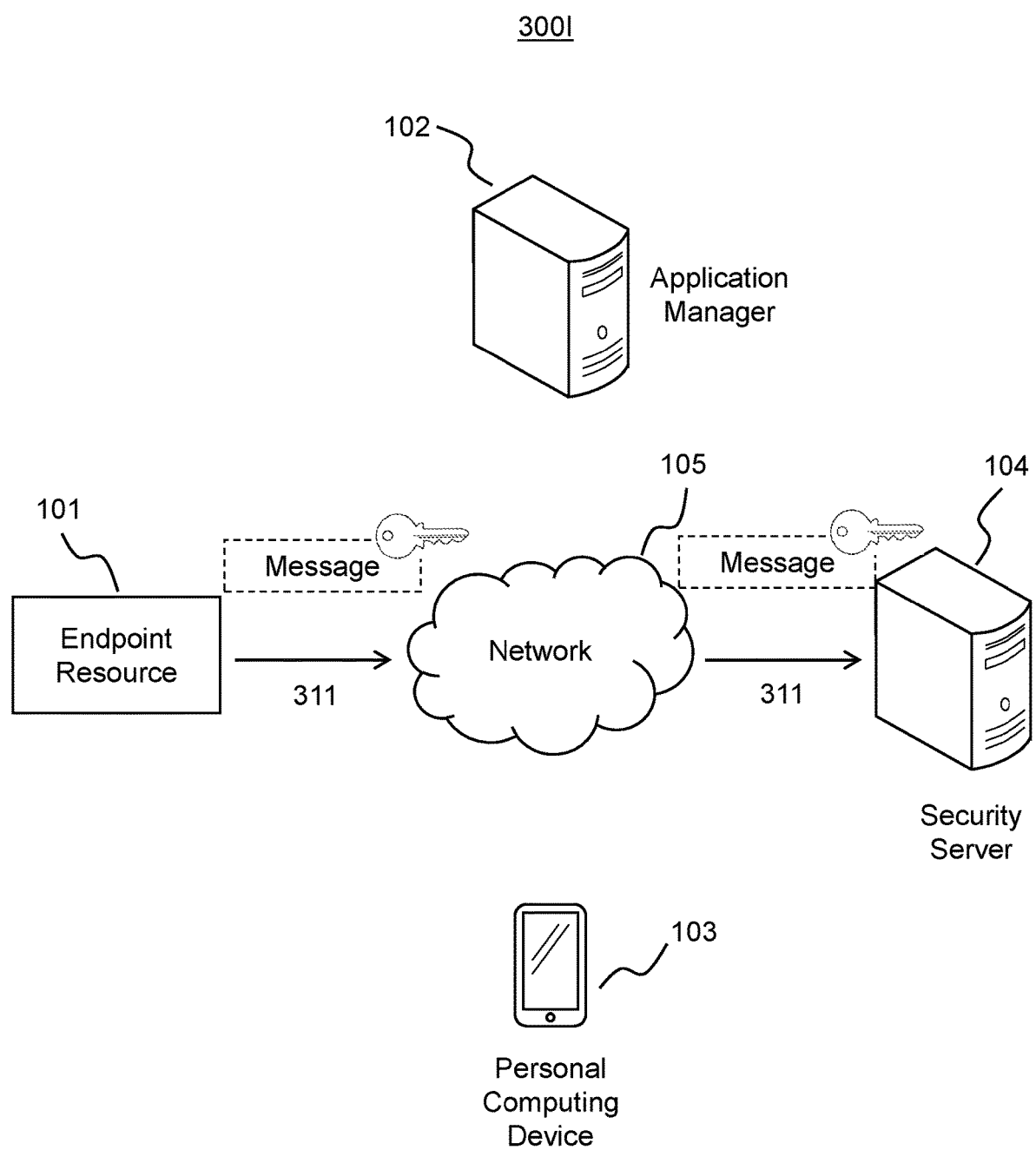
FIG. 3I is a block diagram of an exemplary system where the endpoint resource transmits signed messages to the security server in accordance with disclosed embodiments.

FIG. 3I is a block diagram of an exemplary system 300I where the endpoint resource 101 transmits signed messages to the security server 104. In accordance with system 300I, endpoint resource 101 may make such transmissions 311 in a variety of contexts. For example, in some embodiments the message may indicate user activity of the software on endpoint resource 101 (e.g., time of use, duration of use, actions performed during use, bandwidth used, identities of users, etc.). Further, some messages may indicate crashes or bugs in the software on endpoint resource 101, and may be transmitted for purposes of troubleshooting or debugging. In additional embodiments, endpoint resource 101 may send messages indicating potentially anomalous or malicious use of endpoint resource 101. For example, a user's activity on endpoint resource 101 may be compared to behavioral profiles or models specific to the user, or to the software on endpoint resource 101. Further, alarming actions on endpoint resource 101 may be detected (e.g., attempted access to restricted directories, files, or applications).

With respect to these types of messages in transmission 311, from endpoint resource 101 to security server 104, endpoint resource 101 may sign the messages before transmission. For example, in accordance embodiments where endpoint resource 101 generates or accesses an asymmetric cryptographic key in FIG. 3H, the messages may be signed using the private key from the key pair. As noted above, the corresponding public key may be previously transmitted to security server 104. In embodiments where endpoint resource 101 generates or accesses a symmetric key, it may sign the outgoing communications with that key. Similarly, a copy of the symmetric key may be previously stored at security server 104, as discussed in connection with FIG. 3H. In some embodiments, the transmissions 311 from endpoint resource 101 include additional identifying data. For example, they may also include the software identifier, tenant identifier, or other data.

Figure 3J:
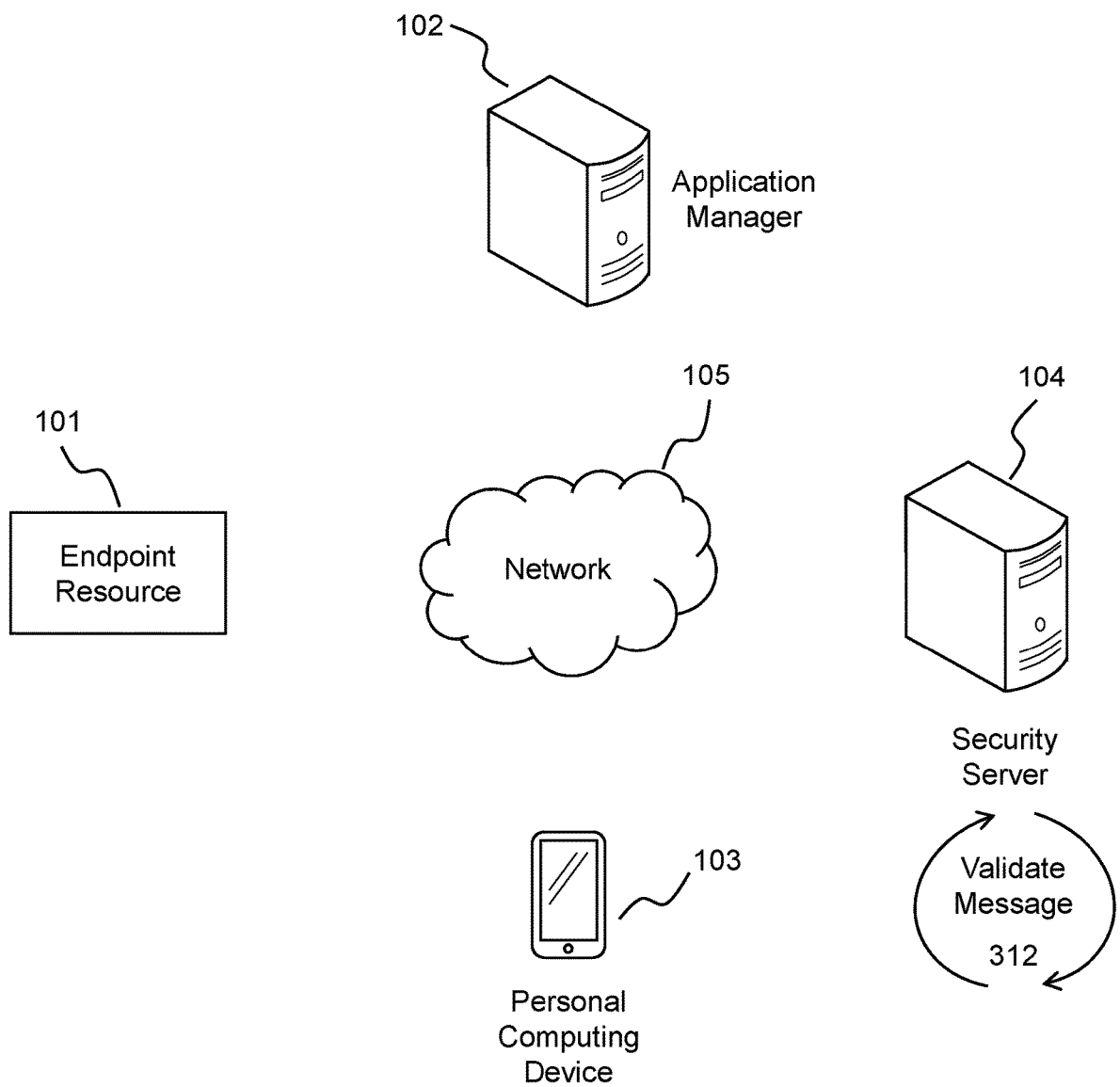
FIG. 3J is a block diagram of an exemplary system where the security server validates signed messages from the endpoint resource in accordance with disclosed embodiments.

FIG. 3J is a block diagram of an exemplary system 300J where the security server 104 validates signed messages from the endpoint resource 101. As discussed above, security server 104 may have previously received asymmetric public keys, or symmetric keys, from endpoint resource 101 as discussed in connection with FIG. 3H. Because the transmissions 311 from endpoint resource 101 are signed with a corresponding key (e.g., the private key, or a copy of the symmetric key), security server 104 may then validate the signed messages in operation 312. For example, this may include identifying a software identifier and/or tenant identifier associated with the transmission 311, and retrieving a corresponding cryptographic key from memory (e.g., from the list, table, or database maintained by security server 104). If the retrieved key is successfully able to validate the signed message (e.g., through a hash comparison), the message may be validated in operation 312.

In some embodiments, security server 104 may be configured to only process the content of messages that it successfully validates in operation 312. Thus, for messages that are not successfully validated (e.g., because they lack a signature, or lack a validated signature), the messages may be discarded by security server or simply transmitted to an auditing or storage server. In this manner, the network load and processing demands on security server 104 are lowered, because security server 104 need only expend processing power on validated messages. Further, this technique may protect security server 104 from messages that may be potentially malicious or insecure (e.g., containing malware, containing fraudulent data, etc.).

Figure 4:
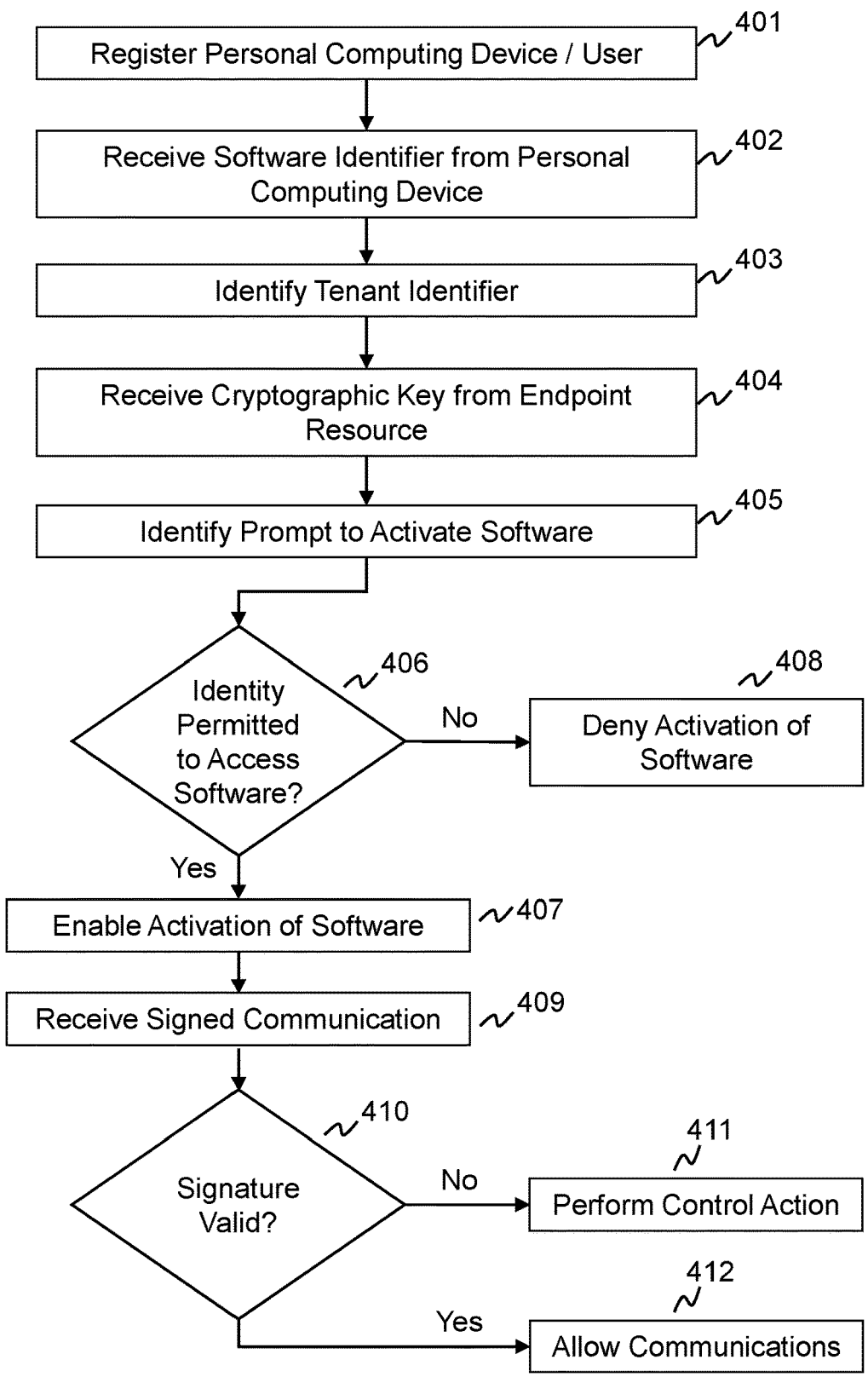
FIG. 4 is a flowchart depicting an exemplary process for securely and efficiently enabling activation of access-limited software to permitted identities in accordance with disclosed embodiments.

FIG. 4 is a flowchart depicting an exemplary process 400 for securely and efficiently enabling activation of access-limited software to permitted identities. In accordance with the embodiments above, the access-limited software may be various types of applications, programs, or code, such as operating systems, programs, agents, upgrades, updates, fixes, patches, code segments, and more. The software may be provided to an endpoint resource 101 in a completely or partially inactivated state (e.g., from application manager 102), where it is completely or partially non-executable on endpoint resource 101. In order to become activated, the software may require the tenant identifier sent from security server 104, or a separate activation or initialization code. Consistent with the embodiments above, security server 104 (or application manager 102) may maintain lists, tables, or databases of particular users (e.g., based on tenant identifiers or other user identifiers) and particular software (e.g., based on software identifiers) on endpoint resource 101. Security server 104 may thus determine numbers of permitted "seats" or licensed users who are permitted to access the software on particular endpoint resources 101.

Process 400 may be performed by security server 104 or application manager 102, according to various embodiments. In accordance with the discussion below, process 400 may perform just-in-time activation of software on an endpoint resource 101. That is, the activation may be triggered and dynamically performed based on the interaction between endpoint resource 101 and personal computing device 103. Prior to a successful activation of the software, the software may be unusable or inactive. This just-in-time process allows, in some embodiments, for the software on endpoint resource 101 to be activated at the time it is needed, and not activated while remaining idle or unused.

Operation 401, which may or may not be performed in all implementations of process 400, includes registering the user of personal computing device 103, or personal computing device 103 itself, to security server 104. For example, as discussed above in connection with FIG. 3A, the registration may include security server 104 storing identifying data regarding personal computing device 103 or its user in a table, list, or database, such as a username, personal name, account name, IP address, MAC address, device identifier (e.g., MIN of personal computing device 103), or other identifying data. In some embodiments, the registration of operation 401 may also include retrieving or generating a tenant identifier for the user or personal computing device 103, which may later be used in activating software on endpoint resource 101.

In an operation 402, process 400 may include receiving, from a personal computing device 103 associated with an identity (e.g., a user, account, application, etc.), a software identifier associated with access-limited software available on an endpoint computing resource 101. As discussed above, the software may be access-limited in the sense that it is completely or partially inexecutable or useable by the identity until it is activated. Consistent with the discussion above regarding FIGS. 3D and 3E, the software identifier may have been obtained by the personal computing device 103 from the endpoint computing resource 101 through short-range communications. For example, the software identified may have been encoded into a QR code or other encoded data representation, transmitted via short-range communications (e.g., Bluetooth™, RFID, NFC, etc.), audibly transmitted, or otherwise made available locally from endpoint resource 101 to personal computing device 103. As discussed above, once personal computing device 103 receives the encoded transmission or projection from endpoint resource 101, it may decode the message to yield the contents, which may be the software identifier.

In an operation 403, process 400 may include identifying a tenant identifier for the identity. This may include, for example, accessing the list, table, or database maintained by security server 104. In some embodiments, the list, table, or database may maintain a tenant identifier associated with the user or the personal computing device 103. In other embodiments, if no tenant identifier has been included in the list, table, or database yet, a tenant identifier may be retrieved (e.g., from application manager 102) or generated. The tenant identifier may then be included in the list, table, or database maintained by security server 104. Consistent with the above embodiments, through maintaining and tracking tenant identifiers, security server 104 is able to determine whether restrictions on software on endpoint resource 101 (e.g., restrictions based on numbers of licensed "seats" or users, permitted activity, permitted durations of activity, permitted bandwidth consumption, etc.) are adhered to.

Process 400 may also include an operation 404 of receiving a cryptographic key from endpoint resource 101. Operation 404 may occur as part of the process of activating software on endpoint resource 101 or subsequent to the activation of the software. As discussed above in connection with FIG. 3H, endpoint resource 101 may generate an asymmetric key pair (e.g., public/private) and send the public key to security server 104. Alternatively, endpoint resource 101 may generate a symmetric key and send a copy of the key to security server 104. In addition to transmitting the key to security server 104, endpoint resource 101 may also transmit other identifying data (e.g., tenant identifier, software identifier, etc.). Once security server 104 receives the key from endpoint resource 101, it may store the key in association the tenant identifier or other identifying data in its list, table, or database. The key may then be available for use in verifying signed communications from endpoint resource 101 in the future.

Operation 405 may include identifying a prompt to activate the access-limited software available on the endpoint computing resource 101. As discussed above, the prompt may take several different forms in different embodiments. For example, as discussed in connection with FIG. 3C, the prompt may be the user of personal computing device 103 attempting to run or execute the software on the endpoint resource 101. Further, the prompt may be endpoint resource 101 receiving a communication (e.g., from application manager 102) indicating that a new version of the software, or a patch or upgrade, is available. In addition, in situations where endpoint resource 101 is an IoT device (e.g., network-connected phone, television, appliance, etc.), the prompt may include the initial powering-on of the device or an initialization process for the device.

In some embodiments, as discussed above, in response to the prompt the endpoint resource 101 will make available the software identifier to the personal computing device 103 through short-range communications. That is, in some embodiments operation 405 may precede operation 402.

In operation 406, process 400 may determine whether to permit access to the access-limited software on the endpoint computing resource 101. For example, this may involve referencing a stored list, table, or database at security server 104 and determining whether the particular user of personal computing device 103, or an associated identity, is permitted to use the software. This determination may be made, for example, on a permitted number of licensed "seats" or users of the software, permitted activities involving the software, permitted durations of use (e.g., hours, days, months, etc.) of the software, permitted bandwidth consumption using the software, or other factors. In further embodiments, both these types of permissions and also security considerations may be part of the determination of whether the user or identity is permitted to access the software in operation 406. For example, security considerations may include whether the user is determined to have behaved anomalously either on endpoint resource 101 or on personal computing device 103 (e.g., deviating from a behavioral profile for the user). Further, the security considerations may include querying a security database or server to verify whether the particular user or identity is a suspicious (e.g., potentially malicious or unknown) user.

If the particular user or identity associated with personal computing device 103 is permitted to use the software on endpoint resource 101, process 400 may proceed with operation 407 of enabling activation of the software. As discussed above, this may include sending the tenant identifier and/or a software activation code from security server 104 to endpoint resource 101, which endpoint resource 101 then uses to activate or initialize the software. On the other hand, if the user or identity is not permitted to access the software, process 400 continues to operation 408 of denying the user access to the software. For example, a prompt may be displayed on the personal computing device or on endpoint resource 101 indicating that access has been denied. Alternatively, access may be denied without any visible prompt.

Following operation 407, the software on the endpoint computing device 101 may become activated and available for use by the user. Either immediately as part of the activation process, or later at various points during use of the software, the endpoint resource 101 may transmit signed communications to security server 104, which are received by security server in operation 409. Examples of such signed communications may be, for instance, confirmation messages indicating a successful activation of the software, usage metrics of the software (e.g., times, durations, activities, bandwidth, etc.), security alerts regarding endpoint resource 101 or the software, or various other data. As discussed above, the communications may be signed by endpoint computing device 101 with a cryptographic key that was previously stored at endpoint computing device 101. This may be, for example, a private key or a symmetric key.

In operation 410, security server 104 may determine whether the signed communication it received in operation 409 is valid (e.g., contains a signature that can be successfully validated). This may include security server 104 retrieving from its table, list, or database a key that it previously received (e.g., public or symmetric key), and attempting the verify the signature (e.g., generate a matching hash value). If the signature on the communication is successfully verified, in operation 410, process 400 may proceed to operation 412 of allowing receipt and processing of the communication. For example, if the communication is a prompt to upgrade or update software on endpoint resource 101, security sever 104 may process the message and request the upgrade or update for the software. On the other hand, if the validation of the signature is unsuccessful (e.g., because the message was unsigned or contained a signature that could not be cryptographically verified), process 400 may move to operation 411 of performing a control action. The control action may be, for example, rejecting and deleting the message, forwarding the message to a storage or auditing repository, or forwarding the message to a security analysis system for further review. Notably, for unverified messages, security server 104 need not waste its processing resources on such messages. Further, because such unverified messages may potentially be harmful or malicious (e.g., containing malware, containing fraudulent data, etc.), security server 104 is also protected from the contents of such messages.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely and efficiently enabling activation of access-limited software to permitted identities, the operations comprising:
   receiving, from a personal computing device associated with an identity, a software identifier associated with access-limited software available on an endpoint computing resource, wherein the software identifier was obtained by the personal computing device from the endpoint computing resource through short-range communications;
   identifying a tenant identifier associated with the identity;
   identifying a prompt to activate the access-limited software available on the endpoint computing resource;
   determining that the identity is permitted to utilize the access-limited software based on at least the software identifier and tenant identifier;
   enabling, based on the determining, activation of the access-limited software for use by the identity at the endpoint computing resource;
   receiving, from the endpoint computing resource, a signed communication; and
   validating the signed communication based on a cryptographic key generated by the endpoint computing resource.

2. The non-transitory computer readable medium of claim 1, wherein the short-range communications include wireless communications between the personal computing device and the endpoint computing resource.

3. The non-transitory computer readable medium of claim 1, wherein the software identifier was obtained by the personal computing device by optically scanning an encoded visible code displayed at the endpoint computing resource.

4. The non-transitory computer readable medium of claim 1, wherein the software identifier and tenant identifier are received in a single communication from the personal computing device.

5. The non-transitory computer readable medium of claim 1, wherein the prompt to activate is based on the receiving of the software identifier.

6. The non-transitory computer readable medium of claim 1, wherein the prompt to activate is based on a communication from the endpoint computing resource.

7. The non-transitory computer readable medium of claim 1, wherein the software identifier is generated by the endpoint computing resource.

8. The non-transitory computer readable medium of claim 1, wherein the access-limited software is a software-based service.

9. The non-transitory computer readable medium of claim 8, wherein the activation of the access-limited software enables the endpoint computing resource to perform the software-based service.

10. The non-transitory computer readable medium of claim 1, wherein the activation of the access-limited software is performed on a just-in-time basis, wherein prior to the activation the identity is unable to utilize the access-limited software.

11. A computer-implemented method for securely and efficiently enabling activation of access-limited software to permitted identities, the method comprising:
   receiving, from a personal computing device associated with an identity, a software identifier associated with access-limited software available on an endpoint computing resource, wherein the software identifier was obtained by the personal computing device from the endpoint computing resource through short-range communications;
   identifying a tenant identifier associated with the identity;
   identifying a prompt to activate the access-limited software available on the endpoint computing resource;

determining that the identity is permitted to utilize the access-limited software based on at least the software identifier and tenant identifier;

enabling, based on the determining, activation of the access-limited software for use by the identity at the endpoint computing resource;

receiving, from the endpoint computing resource, a signed communication; and validating the signed communication based on a cryptographic key generated by the endpoint computing resource.

12. The computer-implemented method of claim 11, wherein the software identifier is a universally unique identifier.

13. The computer-implemented method of claim 11, wherein the signed communication is received after the activation of the access-limited software.

14. The computer-implemented method of claim 11, wherein the signed communication is received as part of a communication from the access-limited software to a back-end system.

15. The computer-implemented method of claim 11, further comprising:

receiving a request associated with a second identity for activation of the access-limited software;

determining that the second identity is not permitted to utilize the access-limited software; and declining to activate the access-limited software for use by the second identity.

16. The computer-implemented method of claim 15, further comprising disregarding the request associated with the second identity.

17. The computer-implemented method of claim 15, further comprising taking a control action for at least one of: the second identity, the endpoint computing resource, or the access-limited software.

* * * * *